United States Patent [19]

Uerpmann

[11] 4,222,889
[45] Sep. 16, 1980

[54] METHOD FOR ENCASING WASTE BARRELS IN A LEACHPROOF CLOSED SHEATH

[75] Inventor: Ernst-Peter Uerpmann, Osterode, Fed. Rep. of Germany

[73] Assignee: Gesellschaft für Strahlen-und Umweltforschung mbH, München, Neuherberg, Fed. Rep. of Germany

[21] Appl. No.: 941,670

[22] Filed: Sep. 12, 1978

[30] Foreign Application Priority Data

Sep. 16, 1977 [DE]  Fed. Rep. of Germany ....... 2741661

[51] Int. Cl.$^2$ ......................... B65D 85/54; B65B 3/04
[52] U.S. Cl. ............................. 252/301.1 R; 53/449; 53/474; 252/301.1 W
[58] Field of Search ................. 53/472, 474, 402, 473, 53/449, 447; 252/301.1 W, 301.1 R; 206/527, 525

[56] References Cited

U.S. PATENT DOCUMENTS 4,139,488  2/1979  Knotik et al. ................ 252/301.1 W

FOREIGN PATENT DOCUMENTS 2351679  4/1975  Fed. Rep. of Germany ............. 53/472

Primary Examiner—Travis S. McGehee
Attorney, Agent, or Firm—Spencer & Kaye

[57] ABSTRACT

Radioactive wastes are encased in closed sheaths, the wastes to be solidified with binders and accommodated in barrels and the closed sheath to be resistant to water and aqueous solutions of natural mineral salts and to leaching, by completely surrounding the waste by a synthetic resin layer between the waste and the barrel or around the barrel containing the waste in accordance with specific methods involving applying spacing layers in the areas to be occupied by the resin layer and subsequently filling the spacing layer with a synthetic resin and a solvent.

7 Claims, 8 Drawing Figures

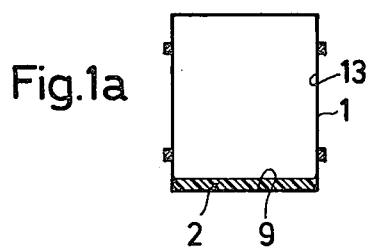
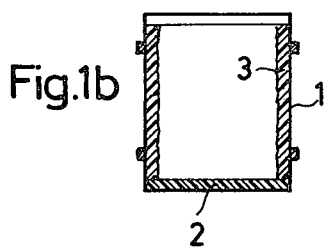
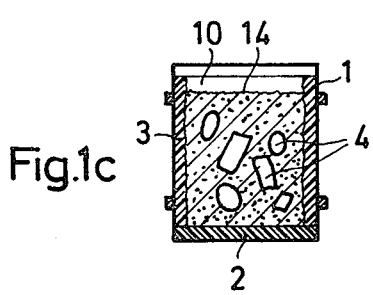
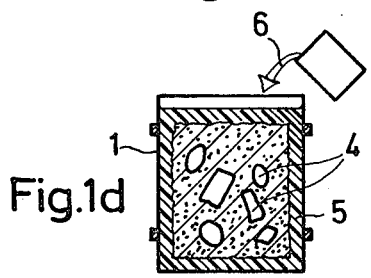
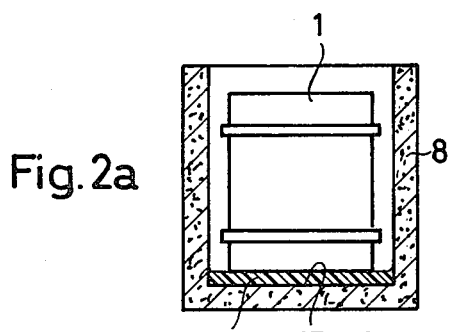
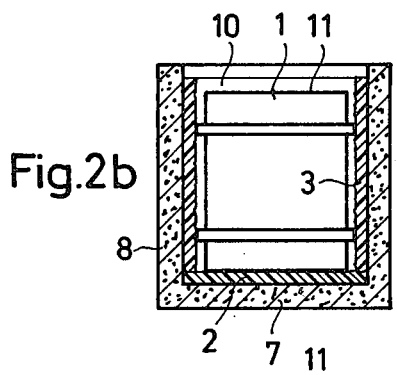
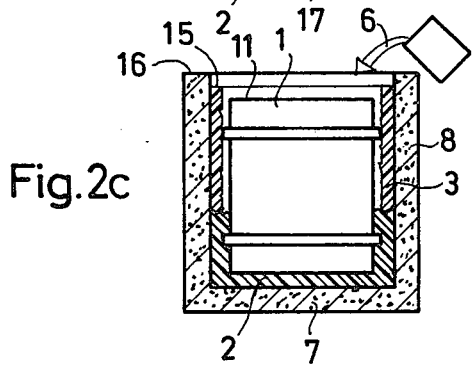
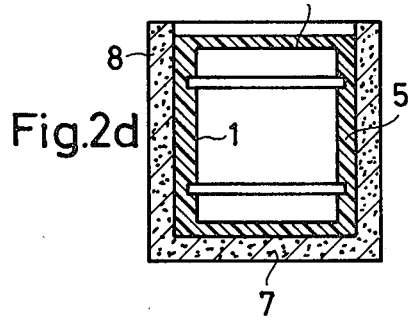

METHOD FOR ENCASING WASTE BARRELS IN A LEACHPROOF CLOSED SHEATH

BACKGROUND OF THE INVENTION

The present invention relates to methods for encasing radioactive wastes in a sheath, the wastes being solidified with binders and stored in waste barrels and the sheath being resistant to leaching, water and aqueous solutions of natural salt minerals.

The leaching resistance of radioactive wastes to water and aqueous solutions of natural mineral salts has an important influence on the evaluation of long-term safety in the permanent storage of radioactive wastes in geological permanent storage facilities or in other types of storage systems. In the past, the solidification of radioactive wastes with respect to water and aqueous solutions was accomplished by mixing the wastes with bitumen or hydraulic binders. These radioactively contaminated masses subsequently were hardened in sheet-metal barrels. At some locations in the Federal Republic of Germany (Wurgassen, Stade), borate-containing liquid wastes from nuclear power plants are directly evaporated into barrels where they harden, upon cooling, into solid salt blocks which are water soluble. Solid contaminated wastes from laboratories, state collection stations and nuclear power plants are filled into barrels without further treatment and are then put into permanent storage. Such wastes are sometimes compacted by pressing.

In another technique, so-called lost concrete shields are used to hold a 200-liter waste barrel and limit the radiation energy at the surface of the containers to the permissible radiation values. However, these containers may be wetted by water and aqueous salt solutions. Moreover, the concrete has pores into which water and dissolved salts can penetrate. This may cause the concrete to be destroyed and the radioactivity to be leached out.

In all these cases, the radioactive wastes would be subjected directly to the influence of water or aqueous solutions if what is considered the worst possible accident, i.e., the hypothetical use of the penetration of water, were to happen at the permanent storage facility. Such an occurrence may result in partial leaching of the radioactivity contained in the barrels. Thus, it is possible that the radioactivity might spread through the water-filled mine facility and could possibly find its way into a layer leading to underground water supplies.

In addition to leaching, dangerous chemical attacks may occur mainly in the wastes that are bound with hydraulic binders. The clinker mineral, tricalcium aluminate (present in cement), will react with the sulfate ions of the aforementioned aqueous solutions to form tricalcium aluminate sulfate (ettringite). Due to the crystallization pressure which is present the structure of the binder would be destroyed and the result may be a crumbly mass. In view of the great surface enlargement of the radioactive waste, this also would increase the proportion of leached radioactivity. For evaporated solutions of borate-containing wastes or of compacted or uncompacted solid wastes, the entire radioactive content may be dissolved or washed out.

SUMMARY OF THE INVENTION

It is an object of the present invention to provide methods for permanently encasing radioactive wastes solidified with binders or so encasing radioactive waste containers themselves such that resistance against water or aqueous salt solutions is assured by the creation of a closed sheath of inactive, hydrophobic and waterproof material which is essentially nonporous, i.e., having tight pores.

These and other objects of this invention are attained by providing a method for encasing radioactive wastes in a closed sheath, the wastes to be solidified with a binder and accommodated in a barrel and the closed sheath to be resistant to water and aqueous solutions of natural mineral salts and to leaching which comprises:

applying a bottom layer of a synthetic resin or a dissolvable spacer material on the bottom of the inside of a waste barrel;

applying a lateral spacer layer inside the barrel along the walls to occupy the space of the lateral portion of a sheath to be applied around the waste;

filling the wastes together with binder into the barrel up to or below the height of the lateral spacer layer and permitting the wastes and binder to set; and then filling the spaces occupied by the lateral spacer layer and, if present, the dissolvable bottom spacer material, as well as the space in the barrel above the waste and binder, with a synthetic resin containing a solvent which dissolves the spacer material of the lateral spacer layer and, if present, the dissolvable bottom spacer material, whereby the synthetic resin forms a sheath completely surrounding the wastes and binder, which sheath has a firm and tight mechanical bond of its sides with its top and bottom. The lateral spacer layer can be a preformed spacer inner container which can be inserted into the barrel.

These objects are also attained by providing another method for encasing radioactive wastes in a closed sheath, the wastes being solidified and accommodated in a barrel and the closed sheath to be resistant to water and to aqueous solutions of natural mineral salts and to leaching, which comprises:

applying a bottom layer of synthetic resin or dissolvable spacer material on the bottom of the inside of an outer sheath;

placing a waste barrel which contains the wastes in the outer sheath, with the outer sheath extending over the entire bottom and side walls of the barrel beyond the top thereof and the barrel resting on the bottom layer;

applying a lateral spacer layer along the outside walls of the barrel between the barrel and the outer sheath to occupy the space of the lateral portion of an inner sheath which is to be applied around the outside of the barrel; and filling the space occupied by the lateral spacer layer and, if present, the dissolvable bottom spacer material as well as a disc area defined by the top of the barrel and the portion of the outer sheath which extends beyond the barrel with a synthetic resin containing a solvent which dissolves the spacer material of the lateral spacer layer and, if present, the dissolvable bottom spacer material whereby the synthetic resin forms a sheath completely surrounding the barrel, which sheath has a firm and tight mechanical bond of its sides with its top and bottom.

BRIEF DESCRIPTION OF THE DRAWINGS

The accompanying drawings, in which like numbers indicate like parts, illustrate examples of presently preferred embodiments of the invention and, together with the description, serve to explain the principles of the invention.

FIGS. 1a to 1d schematically illustrates one process of this invention for encasing the inside of a waste-containing barrel; and FIGS. 2a to 2d schematically illustrates another process of this invention for encasing the outside of a waste-containing barrel.

DETAILED DESCRIPTION OF THE INVENTION

In practicing the methods of this invention, it has been found to be of particular advantage to use polyester resin or epoxy resin as the synthetic resin, styrene as the solvent and foamed polystyrene as the material for the bottom spacer layer, for the lateral spacer layer and for the preformed inner container. Likewise, the barrels may be placed onto blocks of synthetic resin serving as spacers as explained hereinafter.

For any of the methods of this invention, the thickness of the bottom layer should be 0.5–2.0 cm, preferably 1.0–2.0 cm; of the lateral layer 0.5–2.0 cm, preferably 1.0–2.0 cm; and of the top layer 0.5–2.0 cm, preferably 1.0–2.0 cm. A preferable concentration of the solvent in the synthetic resin would be 15% stirene.

The particular advantages of the solution of the present invention include the introduction of a not previously used inactive layer of a waterproof and hydrophobic material around the waste. When provided in sufficient thickness, this layer assures that water or aqueous solutions of natural minerals will not come into direct contact with the radioactive wastes being permanently stored in geological formations. Consequently, the danger of leaching, possible chemical decomposition of the binder and spreading of radioactive materials is definitely reduced if not completely prevented until the wastes decompose to harmless values. The present invention, and in particular the ease of its technological and industrial realization, offers great advantages for the security of permanent storage of radioactive wastes and also of chemical wastes in geological formations. It can also be applied to other methods of storage of other materials as long as appropriate consideration is given to the interactions among waste product, packaging material, inactive water-tight barrier layers and storage medium. Leaching and spread of radioactive or other dangerous wastes is decisively reduced.

The present invention will now be explained in detail with reference to two embodiments illustrated in FIGS. 1a through 1d and 2a through 2d.

FIGS. 1a through 1d show four process steps in which radioactive wastes 4, bond in a binder of cement or gypsum, are to be introduced into a waste barrel 1 made of, for example, metal, (e.g., steel). The bottom 9 of the empty waste barrel 1 (see FIG. 1a) is covered with a synthetic resin layer 2, e.g., a polyester resin, to a sufficient thickness of about 1 to 2 cm. Instead of this layer 2 of synthetic resin, a bottom spacer layer of dissolvable foamed polystyrene can also be used.

After hardening of the polyester resin in layer 2, or after applying a dissolvable bottom spacer material 2 and if the binder is of stiff consistency, the interior wall 3 of the empty barrel 1 is lined with a lateral spacer layer 3, e.g., of flexible foils of foamed polystyrene, in several layers, each of a thickness of 0.3–0.5 cm and total of a thickness of about 1 to 2 cm (see FIG. 1b). Alternatively, after the hardening of the bottom layer 2 of synthetic resin, a preformed vessel with a bottom of foamed polystyrene could be inserted to serve as a lateral spacer layer and as a bottom dissolvable layer.

This preform or spacer layer 3 is used to assure that an annular space remains after solidification of the wastes 4 which are introduced in the form of a mash or slurry. After setting and hardening of the radioactive waste 4 which has been mixed with hydraulic binders (see FIG. 1c), the lateral spacer layer 3 should extend somewhat beyond the surface 14 of the waste 4 or up to the surface. Also, it should extend only to a height lower than the top of the barrel. Thus, an upper space component 10 is formed. Thereafter, the foamed polystyrene of the spacer layer 3 and, if present, of bottom layer 2 will be replaced by polyester 6 (see FIG. 1d).

The polyester resin 6 in a solution of styrene as solvent is filled into the spacer layers and covers the foamed polystyrene. The styrene is capable of dissolving the foamed polystyrene of the layers, e.g., 3, which has been introduced as spacer material. This process is readily accomplished by suitable routine selection of the setting time of the resin, which is regulated by the presence of hardeners and selection of temperature, so that all of the polystyrene is dissolved. This step can be facilitated by providing open channels on the outside of the spacer layer (not shown in detail) to permit the penetration of the liquid resin between the foamed polystyrene (layer 3) and the container wall 13.

After the filled in polyester resin 6 has hardened, the radioactive waste 4 which has been solidified with hydraulic binders is thus completely encased by an inactive sheath 5 of polyester resin which has a thickness of 1 to 2 cm and fills the areas 2,3 and 10. If the layer 2 already consisted of cold-hardening synthetic resin, the latter will form a firm, tight mechanical bond with the filled-in synthetic resin 6 which occupies the space of the lateral supports 3 and the space 10 above the wastes 4, respectively. If there is any remaining, unfilled space at the top of the barrel up to its cover, this space, which is not shown, may then be filled, for example, with inactive concrete. In order to improve the mechanical properties of the synthetic resin sheath, glass fibers may be added to the liquid resin, for all embodiments of this invention.

In a second embodiment of this invention, the wastes barrel 1 itself is encased on all sides in a tight sheath 5. In this case, one procedure may be according to the method steps shown schematically in FIGS. 2a through 2d.

In FIG. 2a, the closed barrel 1 has been placed onto a bottom spacer layer 2 of already hardened synthetic resin or epoxy resin and this layer 2 itself is laid at the bottom 17 of an outer sheath comprised of a bottom 7 and a lateral side wall 8, for example, a concrete shield. As shown, the outer shield extends beyond the upper edge of the barrel, but can also extend up to its upper edge. The interstice between the side wall 8 of the outer sheath and the side walls of the barrel 1 is filled, according to FIG. 2b, with the spacer layer 3 of foamed polystyrene so that this spacer layer 3 protrudes somewhat beyond the cover 11 of the barrel 1 and there forms an empty space 10. Thereafter, according to FIG. 2c, polyester resin 6 containing styrene as solvent is filled in around barrel 1 until it reaches the frontal face 15 of the lateral shield 3 or beyond it or up to the frontal face 16 of the side wall 8 of the outer sheath. This polyester resin dissolves the foamed polystyrene of the lateral spacer layer 3 and forms a bond with the bottom layer 2 of the already hardened synthetic resin to form a firm and tight mechanical connection. The bottom layer 2, the space that was occupied by the lateral spacer material 3, and the space 10 above the cover 11 are thereby filled with polyester resin. After hardening of the added polyester resin 6 and dissolution of the lateral spacer layer 3, a sheath 5 is formed around barrel 1 encasing it on all sides.

Alternatively, a waste barrel can also be placed into an outer sheath, for example, a lost concrete shielding, on a plurality of spacer members of, for example, synthetic resin, and can be centered by laterally applied spacer members. After pouring a cold-hardening synthetic resin over and around the barrel, the sheath 5 is formed around the barrel which is encased on all sides.

It will be understood that the above description of the present invention is susceptible to various modifications, changes and adaptations, and the same are intended to be comprehended within the meaning and range of equivalents of the appended claims.

What is claimed is:

1. A method for encasing radioactive wastes in a closed sheath, the waste to be solidified with a binder and accommodated in a barrel, and the closed sheath to be resistant to water and aqueous solutions of natural mineral salts and to leaching, which comprises:

applying a bottom layer of a synthetic resin or a dissolvable spacer material on the bottom of the inside of a waste barrel;

applying a lateral spacer layer inside the barrel along the walls to occupy the space of the lateral portion of a sheath to be applied around the waste;

filling the wastes together with the binder into the barrel up to or to below the height of the lateral spacer layer and permitting the wastes and binder to set; and then filling the spaces occupied by the lateral spacer layer and, if present, the dissolvable bottom spacer material, as well as the space in the barrel above the wastes and binder, with a synthetic resin containing a solvent which dissolves the spacer material of the lateral spacer layer and, if present, the dissolvable bottom spacer material, whereby the synthetic resin forms a sheath completely surrounding the wastes and binder, which sheath has a firm and tight mechanical bond of its sides with its top and bottom.

2. A method for encasing radioactive wastes in a closed sheath, the wastes being solidified and accommodated in a barrel and the closed sheath to be resistant to water and to aqueous solutions of natural mineral salts and to leaching, which comprises:

applying a bottom layer of synthetic resin or dissolvable spacer material on the bottom of the inside of an outer sheath;

placing a waste barrel which contains the wastes in the outer sheath, with the outer sheath extending over the entire bottom and side walls of the barrel beyond the top thereof and the barrel resting on the bottom layer;

applying a lateral spacer layer along the outside walls of the barrel between the barrel and the outer sheath to occupy the space of the lateral portion of an inner sheath which is to be applied around the outside of the barrel; and filling the space occupied by the lateral spacer layer and, if present, the dissolvable bottom spacer material, as well as a disc area defined by the top of the barrel and the portion of the outer sheath which extends beyond the barrel, with a synthetic resin containing a solvent which dissolves the spacer material of the lateral spacer layer and, if present, the dissolvable bottom spacer material, whereby the synthetic resin forms a sheath completely surrounding the barrel, which sheath has a firm and tight mechanical bond of its sides with its top and bottom.

3. The method of claim 1, wherein the synthetic resin is a polyester resin or an epoxy resin, the solvent is styrene and the spacer material of the bottom layer and of the lateral spacer is foamed polystyrene.

4. The method of claim 2, wherein the synthetic resin is a polyester resin or an epoxy resin, the solvent is styrene and the spacer material of the bottom layer and of the lateral spacer is foamed polystyrene.

5. The method of claim 1, wherein the lateral spacer layer is applied by inserting a preformed spacer insert.

6. The encased radioactive waste product produced by the method of claim 1.

7. The encased radioactive waste product produced by the method of claim 2.

* * * * *